US012666195B2

(12) United States Patent
Stoppel et al.

(10) Patent No.: US 12,666,195 B2
(45) Date of Patent: Jun. 23, 2026

(54) MEMS SOUND TRANSDUCER HAVING RECESSES AND PROJECTIONS

(71) Applicant: Fraunhofer-Gesellschaft zur Förderung der angewandten Forschung e.V., Munich (DE)

(72) Inventors: Fabian Stoppel, Itzehoe (DE); Malte Florian Niekiel, Itzehoe (DE); Bernhard Wagner, Itzehoe (DE); Fabian Lofink, Itzehoe (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 179 days.

(21) Appl. No.: 18/466,082

(22) Filed: Sep. 13, 2023

(65) Prior Publication Data

US 2023/0421947 A1 Dec. 28, 2023

Related U.S. Application Data

(63) Continuation of application No. PCT/EP2022/056728, filed on Mar. 15, 2022.

(30) Foreign Application Priority Data

Mar. 16, 2021 (DE) ......................... 102021202573.0

(51) Int. Cl.
*H04R 1/22* (2006.01)

(52) U.S. Cl.
CPC ......... *H04R 1/22* (2013.01); *H04R 2201/003* (2013.01)

(58) Field of Classification Search
CPC .... H04R 1/22; H04R 19/02; H04R 2201/003; H04R 17/00
See application file for complete search history.

(56) References Cited

U.S. PATENT DOCUMENTS 9,487,386 B2 11/2016 Dehe
2011/0182150 A1 7/2011 Cohen et al.
(Continued)

FOREIGN PATENT DOCUMENTS

CN 103922271 B 8/2017
DE 600 37 132 T2 9/2008
(Continued)

OTHER PUBLICATIONS

English machine translation of DE-102015203076-B3 (Klos et al.; Sensor For Detecting Sound Events Of An Object And Method; published Jun. 2016) (Year: 2016).*
(Continued)

*Primary Examiner* — Mark Fischer
(74) *Attorney, Agent, or Firm* — McClure, Qualey & Rodack, LLP

(57) ABSTRACT

Embodiments of the present disclosure describe MEMS sound transducers for generating sound, having an actuator, wherein the actuator is separated from a surrounding structure by one or more gaps and is configured to execute a relative movement between the actuator and the surrounding structure. Additionally, the MEMS sound transducer has the surrounding structure, wherein the actuator and the surrounding structure has a plurality of recesses and projections which are separated by one or more gaps, wherein the plurality of projections belonging to the actuator are arranged to interdigitate into the plurality of recesses belonging to the surrounding structure, and/or the plurality of projections belonging to the surrounding structure to interdigitate into the plurality of recesses belonging to the actuator.

15 Claims, 8 Drawing Sheets

(56) References Cited

U.S. PATENT DOCUMENTS

| | | | |
|---|---|---|---|
| 2013/0121509 | A1 | 5/2013 | Hsu et al. |
| 2018/0288532 | A1 | 10/2018 | Wu et al. |
| 2020/0100033 | A1 | 3/2020 | Stoppel et al. |

FOREIGN PATENT DOCUMENTS

| | | | | |
|---|---|---|---|---|
| DE | 10 2007 052 367 | A1 | | 5/2009 |
| DE | 10 2012 220 819 | A1 | | 5/2013 |
| DE | 102015203076 | B3 | * | 6/2016 |
| DE | 10 2017 208 911 | A1 | | 11/2018 |
| WO | 02/51004 | A1 | | 6/2002 |

OTHER PUBLICATIONS

International Search Report and Written Opinion issued in application No. PCT/EP2022/056728.

* cited by examiner

100

100

MEMS SOUND TRANSDUCER HAVING RECESSES AND PROJECTIONS

CROSS-REFERENCE TO RELATED APPLICATIONS

This application is a continuation of copending International Application No. PCT/EP2022/056728, filed Mar. 15, 2022, which is incorporated herein by reference in its entirety, and additionally claims priority from German Application No. 102021202573.0, filed Mar. 16, 2021, which is also incorporated herein by reference in its entirety.

TECHNICAL FIELD

Embodiments in accordance with the present disclosure relate to an MEMS sound transducer having recesses and projections. Further embodiments relate to MEMS sound transducers having microstructures for air attenuation.

BACKGROUND OF THE INVENTION

MEMS loudspeakers rely on displacing air by the lifting movement or bending movement of an actuator, as do conventional loudspeakers. The sound level generated in this way is proportional to the displaced air volume. An implementation of an MEMS loudspeaker having piezoelectrically driven vertically moving microactuators is illustrated in FIG. 1 (from F. Stoppel, A. Männchen, F. Niekiel, D. Beer, T. Giese, I. Pieper, D. Kaden, S. Grünzig, B. Wagner, Piezoelektrische MEMS-Lautsprecher für In-Ear-Anwendungen, MikroSystemTechnik Kongress 2019, Berlin, 182-185; DE10 2017 208 911).

FIG. 1 shows a schematic illustration of an MEMS loudspeaker 100 in a non-deflected state (top) and deflected state (bottom). The MEMS loudspeaker comprises a chip frame 110, or substrate, and actuators 120 suspended at the chip frame 110. The actuators are two-layered, made of one layer of piezoelectric PZT (lead-zirconate-titanate) and one layer of polysilicon 140. Decoupling slots 150 are arranged between the actuators. When deflecting (bottom), the actuators can move decoupled from one another, due to the decoupling slots 150.

In the case shown, the sound-generating actuator structure is not implemented by a closed membrane, but made of several actuators 120 separated by narrow slots 150. The moved MEMS actuator structures, however, may exhibit high resonance qualities (superelevation of the oscillation amplitudes) with values in the range of 100. The result is that the sound pressure level generated may exhibit sharp resonance peaks in the frequency response, which may result in acoustic distortions (see FIG. 2 and FIG. 3).

FIG. 2 shows a sound pressure level (SPL), in dB, of the MEMS loudspeaker, measured in an ear simulator at different drive voltages with and without an equalizer (EQ) filter over frequency in Hz. The lower continuous line describes a sound pressure level at one Volt with an EQ filter, the dotted line describes a sound pressure level at one Volt without EQ filter, and the top continuous line describes a sound pressure level at ten Volts with EQ filter. The sound pressure level at one Volt without EQ filter exhibits a large peak at somewhat more than 8000 Hz. FIG. 2 shows that the sound pressure level can be smoothed by means of electronic filters. However, the distortions, that is harmonic distortions of the loudspeaker, cannot be reduced by these measures (see FIG. 3).

FIG. 3 shows harmonic distortions in % at an amplitude of 1 V with EQ filter (corresponds to roughly 85 dB SPL) over frequency in Hz. The total harmonic distortion (THD) and portions of individual harmonics in the harmonic distortion (k2, k3, k5) are plotted in FIG. 3. The plotted quantities indicate a ratio of an, for example, undesired harmonic proportion in the signal. FIG. 3 exhibits high peaks of distortion and portions in harmonic distortions in the region of almost 2000 Hz and in the region of somewhat more than 3000 Hz. FIG. 3 shows that EQ filters cannot smooth these signal distortions.

Due to the distortions, not the entire bandwidth of a corresponding MEMS sound transducer can be made use of, for example. In applications in the ultrasonic range, for example, sound transducers of low quality, that is high bandwidth, are used. Thus, the transducer may, among other things, generate short impulses in an impulse echo method or receive or transmit modulated signals in the continuous wave method.

In previous MEMS sound transducers, the resonances of the actuators cannot be attenuated specifically. It would, for example, be desirable to achieve qualities in the range of smaller than 5 and/or completely suppress the resonance peak. Consequently, there is need for an improved approach.

The object underlying the present invention is providing a concept which allows specifically attenuating resonances of actuators of MEMS sound transducers.

SUMMARY

According to an embodiment, a method for manufacturing an MEMS sound transducer for generating sound may have the steps of: providing an actuator and a surrounding structure, wherein the actuator is separated from the surrounding structure by one or more gaps and is configured to execute a relative movement between the actuator and the surrounding structure, and wherein the actuator and the surrounding structure have a plurality of recesses and projections, wherein the plurality of projections belonging to the actuator are arranged to interdigitate into the plurality of recesses belonging to the surrounding structure, and/or the plurality of projections belonging to the surrounding structure to interdigitate into the plurality of recesses belonging to the actuator, forming the interdigitating elements such that the interdigitating elements are thus separated by the one or more gaps, and such that overlapping areas of the plurality of recesses and projections are configured such that the interdigitating elements have a frequency-depending attenuation function with a relative movement between the actuator and the surrounding structure to suppress harmonic distortions; and wherein the overlapping areas are directly opposite areas moving past each other by the relative movement.

According to another embodiment, an MEMS sound transducer for generating sound may have: an actuator, wherein the actuator is separated from a surrounding structure by one or more gaps and is configured to execute a relative movement between the actuator and the surrounding structure, and the surrounding structure, wherein the actuator and the surrounding structure have a plurality of recesses and projections, wherein the plurality of projections belonging to the actuator are arranged to interdigitate into the plurality of recesses belonging to the surrounding structure, and/or the plurality of projections belonging to the surrounding structure to interdigitate into the plurality of recesses belonging to the actuator, wherein the interdigitating elements are separated by one or more gaps, and wherein the interdigitating elements are separated by one or more gaps such that the interdigitating elements have an attenuation function with a relative movement between the actuator and the surrounding structure; and wherein the actuator is arranged in a first plane, and wherein the surrounding structure is arranged in a second plane, the first and second planes being parallel to each other; and wherein the actuator is configured to execute the relative movement between the actuator and the surrounding structure perpendicularly to the first and second planes; and wherein the actuator has a plurality of projections in the form of columns and/or combs, wherein the columns and/or combs are arranged on a surface of the actuator facing the surrounding structure, perpendicularly to the parallel planes; and wherein the surrounding structure has a plurality of recesses in the form of holes and/or slots; and wherein the columns and/or combs of the actuator and the holes and/or slots of the surrounding structure are configured to interdigitate; and/or wherein the surrounding structure is arranged in a first plane, and wherein the actuator is arranged in a second plane, the first and second planes being parallel to each other; and wherein the actuator is configured to execute the relative movement between the actuator and the surrounding structure perpendicularly to the first and second planes; and wherein the surrounding structure has a plurality of projections in the form of columns and/or combs, wherein the columns and/or combs are arranged on a surface of the surrounding structure facing the actuator, perpendicularly to the parallel planes; and wherein the actuator has a plurality of recesses in the form of holes and/or slots; and wherein the columns and/or combs of the surrounding structure and the holes and/or slots of the actuator are configured to interdigitate.

Embodiments according to the present disclosure provide MEMS sound transducers for generating sound, having an actuator which is separated form a surrounding structure by one or more gaps and configured to execute a relative movement between the actuator and the surrounding structure. Additionally, the MEMS sound transducer comprises the surrounding structure, wherein the actuator and the surrounding structure comprise a plurality of recesses and projections, wherein the plurality of projections belonging to the actuator are arranged to interdigitate (or engage) into the plurality of recesses belonging to the surrounding structure, and/or the plurality of projections belonging to the surrounding structure interdigitate into the plurality of recesses belonging to the actuator, wherein the interdigitating elements are separated by one or more gaps.

Embodiments in accordance with the present disclosure are based on the core idea of allowing a frequency-dependent signal attenuation of an MEMS sound transducer by arranging recesses and projections, for example in the form of interdigitating meanders. Due to the relative movement between the actuator and the surrounding structure, a gas, for example air (generally medium), present in the gap between the actuator and the surrounding structure is displaced. The result is (air) friction, which in turn attenuates the actuator. The speed of gas in the gap thus is dependent on the oscillating frequency of the actuator. The speed-dependent and, thus, frequency-dependent attenuation can be made use of by correspondingly selecting the geometries of actuator and surrounding structure so as to attenuate certain frequencies of the MEMS sound transducer. This advantageously allows optimizing the sound transducer or acoustic characteristics.

An inventive MEMS loudspeaker is able to suppress harmonic distortions which cannot be filtered electronically, or are very difficult to filter (see, for example, FIG. 3). Attenuation here is dependent on the overlapping areas of actuator and surrounding structure, which move past each other due to the relative movement, and on the distance of the overlapping areas of actuator and surrounding structure relative to each other. The overlapping areas, expressed differently, are the areas of the actuator and the surrounding structure which are directly opposite the surrounding structure and the actuator and which move past each other due to the relative movement. For example, these areas of actuator and surrounding structure may be implemented to be parallel to each other and move past each other in parallel, or at least partially in parallel, due to the relative movement.

In order to increase the attenuation, according to the disclosure, this area is increased by using interdigitating projections and/or recesses, for example with additional plate structures on the actuator and the surrounding structure. Additionally or alternatively, attenuation can be increased by a small distance between the areas.

In other words, embodiments of the present disclosure are based on the idea of integrating additional flow-mechanical structures, like plate structures and/or projections and/or recesses, for example, by means of which the MEMS sound transducer, for example implemented as a loudspeaker, is attenuated by means of viscous gas flow or air flow.

In embodiments in accordance with the present disclosure, the interdigitating elements are separated by one or more gaps such that the interdigitating elements exhibit an attenuation function, that is, for example, the attenuation discussed before, with a relative movement between actuator and surrounding structure.

In embodiments in accordance with the present disclosure, the actuator comprises the plurality of recesses and projections belonging to the actuator along at least 50% or along at least 75% or at least along 90% or at least along 99% or along 100% of the one or more gaps. Alternatively or additionally, the surrounding structure may comprise the plurality of recesses and projections belonging to the surrounding structure along at least 50% or along at least 75% or at least along 90% or at least along 99% or along 100% of the one or more gaps.

In further embodiments in accordance with the present disclosure, the surrounding structure is formed by a substrate. A particularly easy and cheap realization of an MEMS sound transducer in accordance with the present disclosure can, for example, be realized by forming projections and recesses directly on the substrate. The actuator may, for example, be etched directly from the substrate and thus be provided with projections and recesses, which interdigitate in corresponding structures of the substrate.

In embodiments in accordance with the present disclosure, the plurality of recesses and projections are implemented to be microstructures with an aspect ratio between height/width of more than 5, wherein the height is a height orthogonal to a surface of the actuator or the surrounding structure on which the projection is arranged. Thus, the width is a width in parallel to the surface of the actuator or the surrounding structure on which the projection is arranged.

Due to a high aspect ratio, the viscous friction and, thus, attenuation can be amplified. The area between actuator and surrounding structure, which contributes to friction can be increased for a desired frequency range, for example, by correspondingly implementing the recesses and projections and, for example, at the same time a smaller distance between the elements can be realized to further increase attenuation. It is to be pointed out here that the aspect ratio does not apply exclusively to the heights of structures, but in analogy to corresponding depths, for example in the case of recesses. Additionally, recesses and/or projections may comprise corresponding heights or depths, for example in particular orthogonally to the direction of movement of the actuator, wherein the width of the recess or structure may be oriented in parallel to the direction of movement.

In embodiments in accordance with the present disclosure, the actuator comprises a piezoelectric or magnetic or electrostatic drive. Alternatively or additionally, the actuator may be formed by a bending transducer. The piezoelectric drive may, for example, advantageously be implemented by means of integrated piezoelectric layers, for example for applications as an MEMS loudspeaker. Piezoelectric drives may exhibit advantages with regard to short response times, high accelerations and low energy consumption. Embodiments hi accordance with the present disclosure, however, are not restricted to piezoelectric drives, but allow using drive concepts which are of particular advantage for an application, for example, optionally electrostatic or magnetic concepts or principles. Implementing the actuator as a piezoelectric bending transducer, or bending actuator, for example, may offer advantages with regard to actuating paths and actuating force, as well as reliability.

In embodiments in accordance with the present disclosure, the projections of the plurality of predictions comprise a height of more than 50 μm, wherein the height is a height orthogonal to a surface of the actuator or the surrounding structure on which the respective projection is arranged.

The implementation of the height of the projections in accordance with the disclosure allows sufficient attenuation to at least partially suppress undesired harmonic distortions, for example (see FIG. 3). This allows achieving an advantageous aspect ratio of projections and corresponding recesses so that the viscous gas friction enables the desired attenuation.

In embodiments in accordance with the present disclosure, the plurality of projections are implemented as columns and/or combs and the plurality of recesses are implemented as holes and/or slots. Columns and combs, and correspondingly holes and slots, may be realized by means of cheap and well-developed manufacturing processes so that a corresponding MEMS sound transducer can be produced in large numbers and/or cheaply. Additionally, corresponding structures, like columns or combs, for example, allow an advantageous aspect ratio to be able to adjust the attenuation sufficiently strongly, for example in correspondence with the requirements of an application. Additionally, holes and slots corresponding to columns and combs allow very small distances between respective elements, which in turn can be of advantage for attenuation.

In embodiments in accordance with the present disclosure, the plurality of recesses and projections are made of at least one among a semiconductor, Ike silicon, silicon compounds, metals or polymers. This allows easy manufacturability using conventional MEMS manufacturing technologies.

MEMS sound transducers in accordance with the disclosure allow using materials of high availability, the respective manufacturing methods of which being technically well developed so that a corresponding MEMS sound transducer can be manufactured at low cost and high quality.

In embodiments in accordance with the present disclosure, the MEMS sound transducer is configured to emit a sound signal when excited by an electrical signal.

An implementation of the MEMS sound transducer as an MEMS loudspeaker in accordance with the disclosure allows canceling, or at least alleviating, problems of previous loudspeakers, for example with regard to harmonic distortions, by the plurality of recesses and projections.

In embodiments in accordance with the present disclosure, the MEMS sound transducer is configured to generate signals in a frequency range of at least 20 Hz and/or up to 20 kHz. Alternatively or additionally, the MEMS sound transducer may be configured to be an MEMS ultrasonic transducer. An MEMS ultrasonic transducer in accordance with the disclosure may be configured to generate signals in a frequency range of at least 20 kHz and/or up to 100 MHz.

Implementing the MEMS sound transducer to a frequency range of 20 Hz to 20 kHz or, in other words, to a frequency range audible for humans, allows using the sound transducer in acoustic applications, like in-ear headsets, smartphones or headsets, for example. By using recesses and projections in accordance with the disclosure, high audio quality can be achieved, for example. In particular, even at high frequencies, undesired harmonic distortions, for example, can be suppressed. An MEMS ultrasonic transducer in accordance with the disclosure may additionally achieve a high bandwidth by attenuating harmonic distortions for high frequencies so that short impulses can be generated for measuring processes like the impulse-echo process, or modulated signals can be transmitted for continuous wave methods.

In embodiments in accordance with the present disclosure, the one or more gaps comprises a width of less than 20 μm, less than 10 μm or less than 5 μm, or generally comprise a width in a range between 0.1 μm and 20 μm. The width of the gap may, for example, be a width in the lateral direction or horizontal direction of the device or MEMS sound transducer.

Corresponding MEMS sound transducers consuming little space on the one hand can be constructed due to the widths in the μm range, and on the other hand sufficient decoupling of the sound pressures in front of and behind the actuator can be avowed so that a defined acoustic sound pressure can be generated. Additionally, corresponding dimensioning of the gaps can be of advantage for the frequency-dependent attenuation or suppressing harmonic distortions, for example.

In embodiments in accordance with the present disclosure, the actuator is implemented as a bending actuator and the bending actuator and the surrounding structure are laterally opposite each other in a plane. The bending actuator is suspended at least on one side relative to the surrounding structure and implemented to execute the relative movement between the bending actuator and the surrounding structure, at least partially perpendicularly to the plane, with one end of the bending actuator. A plurality of recesses and/or projections in the form of a first comb structure are implemented at the moving end of the bending actuator, in the common plane of bending actuator and surrounding structure. The surrounding structure comprises, on a side facing the moving end of the bending actuator, a plurality of recesses and/or projections in the form of a second comb structure, the first and second comb structures being configured to interdigitate.

By arranging actuator and surrounding structure laterally in one plane, a corresponding MEMS sound transducer in accordance with the disclosure can be implemented with small space requirements perpendicularly to the plane. By using a bending actuator, additionally high sound pressures, which are of advantage for certain applications, for example, can be generated. Due to the lever movement, the relative movement of the actuator may be partially perpendicular to the surrounding structure so that the overlapping areas are also moved past one another partially perpendicularly. In addition, the bending actuator may be surrounded by the surrounding structure at several ends so that recesses and projections can be arranged on several sides of the actuator which perform a relative movement relative to the surrounding structure, for example in the form of a comb structure. In analogy, additionally or alternatively, projections and recesses, for example in the form of the second comb structure, may be implemented on the corresponding sides of the surrounding structure so that the recesses and projections of the actuator and the projections and recesses of the surrounding structure interdigitate.

In embodiments in accordance with the present disclosure, the actuator is implemented to be a lifting actuator, wherein the lifting actuator and the surrounding structure are arranged within one plane. The lifting actuator is configured to execute the relative movement between the lifting actuator and the surrounding structure perpendicularly to the plane and comprises a plurality of recesses and/or projections in the form of a first comb structure along its periphery in the plane. Additionally, the surrounding structure comprises a plurality of recesses and/or projections in the form of a second comb structure on a side facing the first comb structure, wherein the first and second comb structures are configured to interdigitate.

Such an MEMS sound transducer in accordance with the disclosure may comprise small space requirements in the direction of the plane in which the actuator and the surrounding structure are arranged, or, in other words, orthogonally to the direction of movement of the actuator. The lifting actuator may, for example, also be implemented to be a piston-shaped actuator.

In embodiments in accordance with the present disclosure, the actuator is arranged in a first plane and the surrounding structure is arranged in a second plane, the first and second planes being parallel to each other, and wherein the actuator is configured to execute the relative movement between the actuator and the surrounding structure perpendicularly to the first and second planes. Thus, the actuator comprises a plurality of projections in the form of columns and/or combs, wherein the columns and/or combs are arranged perpendicularly to the parallel planes on a surface of the actuator facing the surrounding structure. The surrounding structure comprises a plurality of recesses in the form of holes and/or slots, wherein the columns and/or combs of the actuator and the holes and/or slots of the surrounding structure are configured to interdigitate.

Implementing the surrounding structure with holes and/or slots allows an, for example, easily and cheaply manufacturable form of the recesses, since a certain depth of etching, for example, does not have to be considered when using an etching method, for example. Additionally, such an MEMS sound transducer having small spatial requirements in accordance with the disclosure may be configured, for example by interdigitating between the columns and/or combs and slots and/or holes since these, due to the relative movement, may move past one another in a quasi-integrally connected manner, separated by a gap. Additionally or alternatively, further recesses and/or projections may be arranged in the plane of the actuator, around the actuator, which in turn are arranged to be interdigitating with corresponding projections and/or recesses of the surrounding structure, or a further surrounding structure.

In embodiments in accordance with the present disclosure, the surrounding structure is arranged in a first plane and the actuator in a second plane, wherein the first and second planes are parallel to each other. The actuator is configured to execute the relative movement between the actuator and the surrounding structure perpendicularly to the first and second planes. Thus, the surrounding structure comprises a plurality of projections in the form of columns and/or combs, wherein the columns and/or combs are arranged perpendicularly to the parallel planes on a surface of the surrounding structure which faces the actuator. The actuator comprises a plurality of recesses in the form of holes and/or slots, wherein the columns and/or combs of the surrounding structure and the holes and/or slots of the actuator are configured to interdigitate.

The actuator may, for example, be configured in particular only partly as a hole and/or slot plate. This can induce advantages, for example with regard to the sound pressure obtainable. In addition, etching out columns and/or combs from a, for example, immobile substrate which forms the surrounding structure, may exhibit advantages for manufacturing.

Further embodiments in accordance with the present disclosure provide MEMS sound transducers for generating sound, having an actuator which is separated from a surrounding structure by one or more gaps. In addition, the MEMS sound transducer comprises the surrounding structure. Thus, the actuator is configured to execute a relative movement between the actuator and the surrounding structure. The structures of the actuator and/or the surrounding structure thus comprise the plurality of recesses and projections, wherein the plurality of projections belonging to the actuator and/or belonging to the plate structures of the actuator are arranged to interdigitate into the plurality of recesses belonging to the surrounding structure and/or belonging to the plate structures of the surrounding structure, and/or the plurality of projections belonging to the surrounding structure and/or belonging to the plate structures of the surrounding structure interdigitate into the plurality of recesses belonging to the actuator and/or belonging to the plate structures of the actuator, the interdigitating elements being separated by one or more gaps.

Implementing recesses and projections in accordance with the invention, that is, for example, integrating additional recesses and projections on plate structures which in turn may form a projection or a part of a projection or, in analogy, recess, allows improved attenuation characteristics, for example for attenuating undesired harmonic distortions at high frequencies.

BRIEF DESCRIPTION OF THE DRAWINGS

Examples in accordance with the present disclosure will be discussed below in greater detail referring to the appended drawings, With regard to the schematic figures illustrated, it is pointed out that the illustrated functional blocks are to be understood to be both elements or features of the apparatus in accordance with the disclosure, and corresponding method steps of the method in accordance with the disclosure, and corresponding method steps of the method in accordance with the disclosure can be derived therefrom. In the figures.

DETAILED DESCRIPTION OF THE INVENTION

Figure 1:
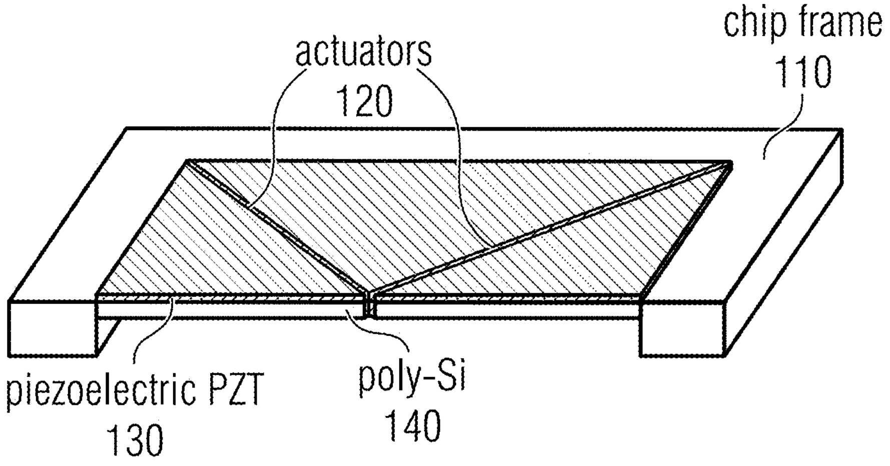
Fig. 1 (PRIOR ART)
FIG. 1 shows a schematic illustration of an MEMS loudspeaker in an undeflected state (top) and deflected state (bottom)
Figure 1:
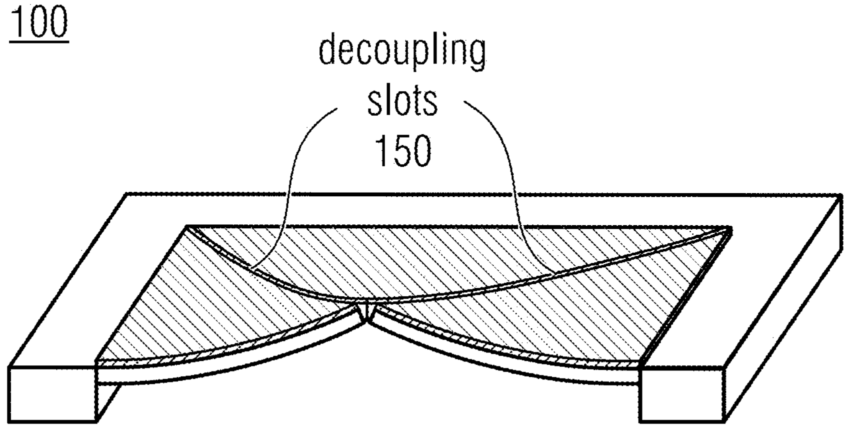
Fig. 1 (PRIOR ART)
Figure 2:
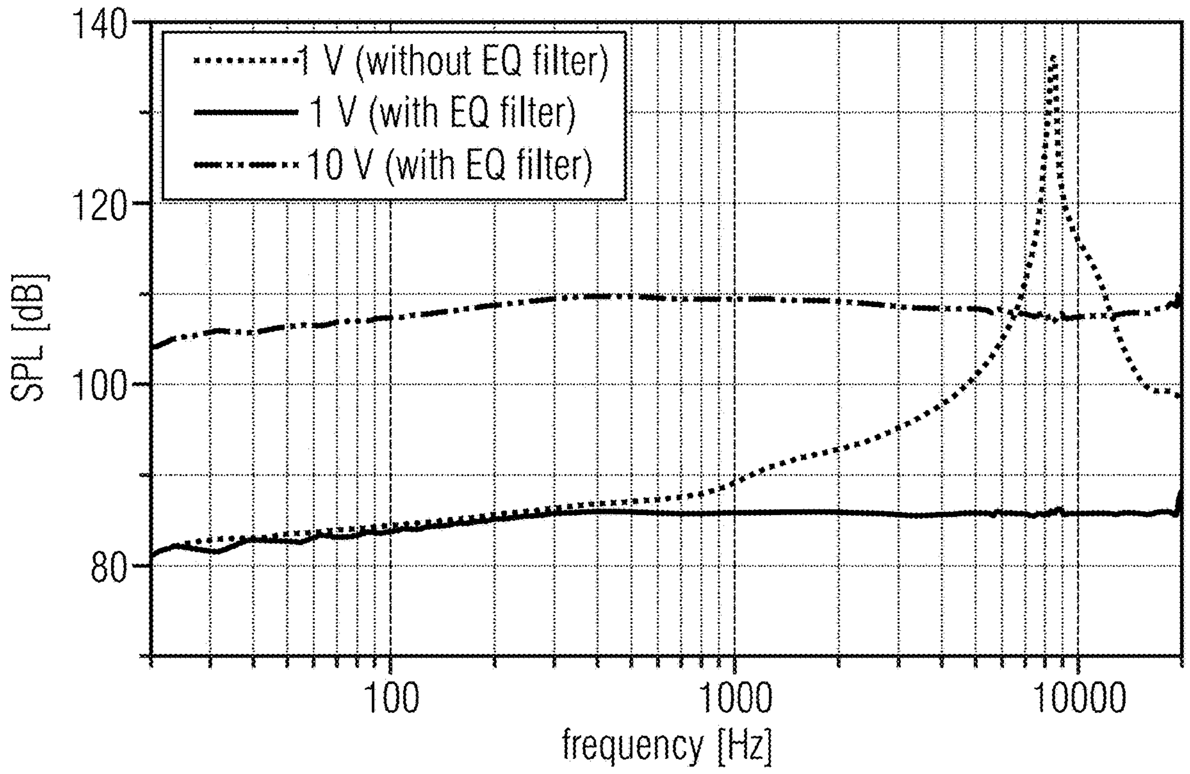
Fig. 2 (PRIOR ART)
FIG. 2 shows sound pressure levels (SPL), in dB, of the MEMS loudspeaker, measured in an ear simulator at different drive voltages with and without an equalizer (EQ) filter over frequency in Hz.
Figure 3:
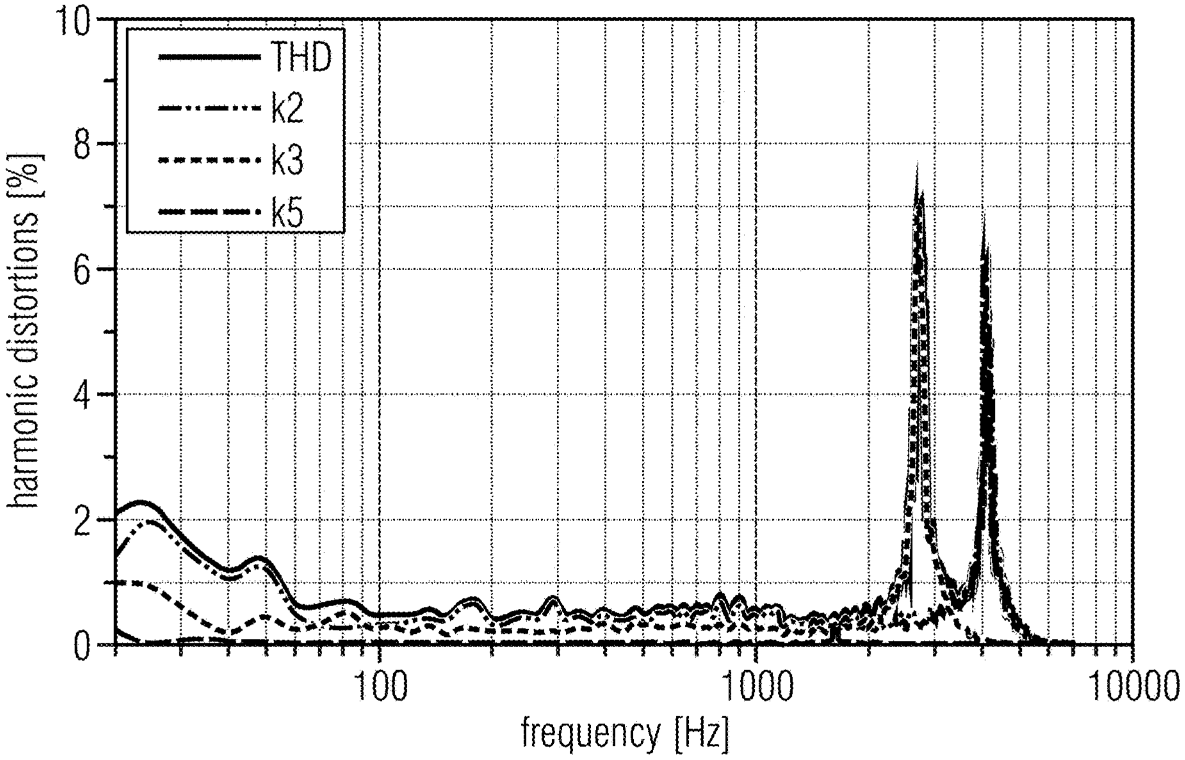
Fig. 3 (PRIOR ART)
FIG. 3 shows harmonic distortions in percent at an amplitude of 1 V with an EQ filter (corresponds to roughly 85 dB SPL) over frequency in Hz.

Before discussing below in greater detail embodiments of the present disclosure making reference to the drawings, it is pointed out that identical elements, objects and/or structures or those of identical function or identical effect are provided with same or similar reference numerals in the different figures so that the description of these elements illustrated in different embodiments is mutually applicable or interchangeable.

Figure 5:
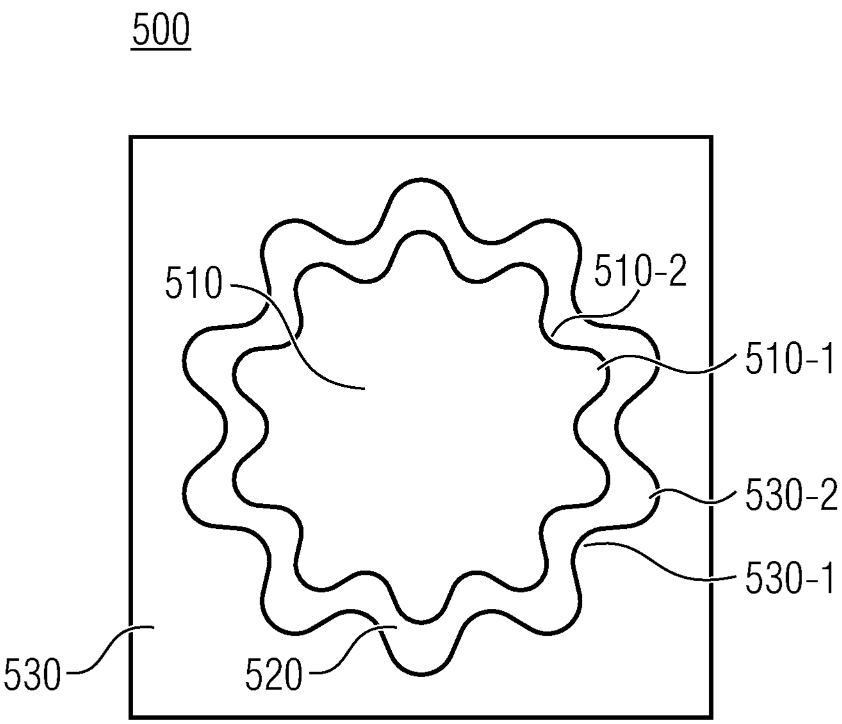
FIG. 5 shows a schematic top view of an MEMS sound transducer in accordance with an embodiment of the present disclosure.

FIG. 5 shows a schematic top view of an MEMS sound transducer in accordance with an embodiment of the present disclosure. FIG. 5 shows the MEMS sound transducer 500 having an actuator 510 which is separated from a surrounding structure 530 (for example the substrate) by a gap 520. The actuator 510 and the surrounding structure 530 comprise a plurality of projections 510-1, 530-1 and recesses 510-2, 530-2, wherein the plurality of projections 510-1 belonging to the actuator are arranged to interdigitate into the plurality of recesses 530-2 belonging to the surrounding structure, and/or the plurality of projections 530-1 belonging to the surrounding structure interdigitated into the plurality of recesses 510-2 belonging to the actuator, wherein the interdigitating elements are separated by the gap 520.

The actuator 510 is thus configured to execute a relative movement between the actuator 510 and the surrounding structure 530 perpendicular to the picture plane. The relative movement allows the actuator 510 to generate an acoustic signal due to electrical excitation. Due to the projections 510-1, 530-1 and recesses 510-2 and 530-2, the MEMS sound transducer comprises large areas between the moved actuator 510 and the surrounding structure 530 which allows frequency-dependent attenuation by viscous gas attenuation, Due to the arrangement, the gap 520 can be selected to be very narrow, which in turn may have a positive effect on the desired attenuation. Thus, certain frequency ranges, for example those of high distortions, can be attenuated.

The projections 510-1, 530-1 and recesses 510-2, 530-2 may thus be implemented in a plurality of variations. Embodiments in accordance with the present disclosure comprise trigonometrical forms of the projections 510-1 and recesses 510-2, or of the projections 530-1 and recesses 530-2, as is shown in FIG. 5. Additionally, embodiments also comprise MEMS sound transducers having projections and recesses with combs, columns, meanders, pins or triangles. Projections and recesses in accordance with the disclosure are, for example, implemented such that the length of the gap 520 and the area between the actor 510 and the surrounding structure 530 is as large as possible to amplify the attenuation. In addition, the actuator 510 may be implemented as a multi-part actuator, or in other words, comprise a multi-part membrane. Additionally, the actuator 510 may be formed in two layers, one layer made of a piezoelectric PZT (lead-zirconate-titanate) and one layer made of polysilicon.

Figure 4:
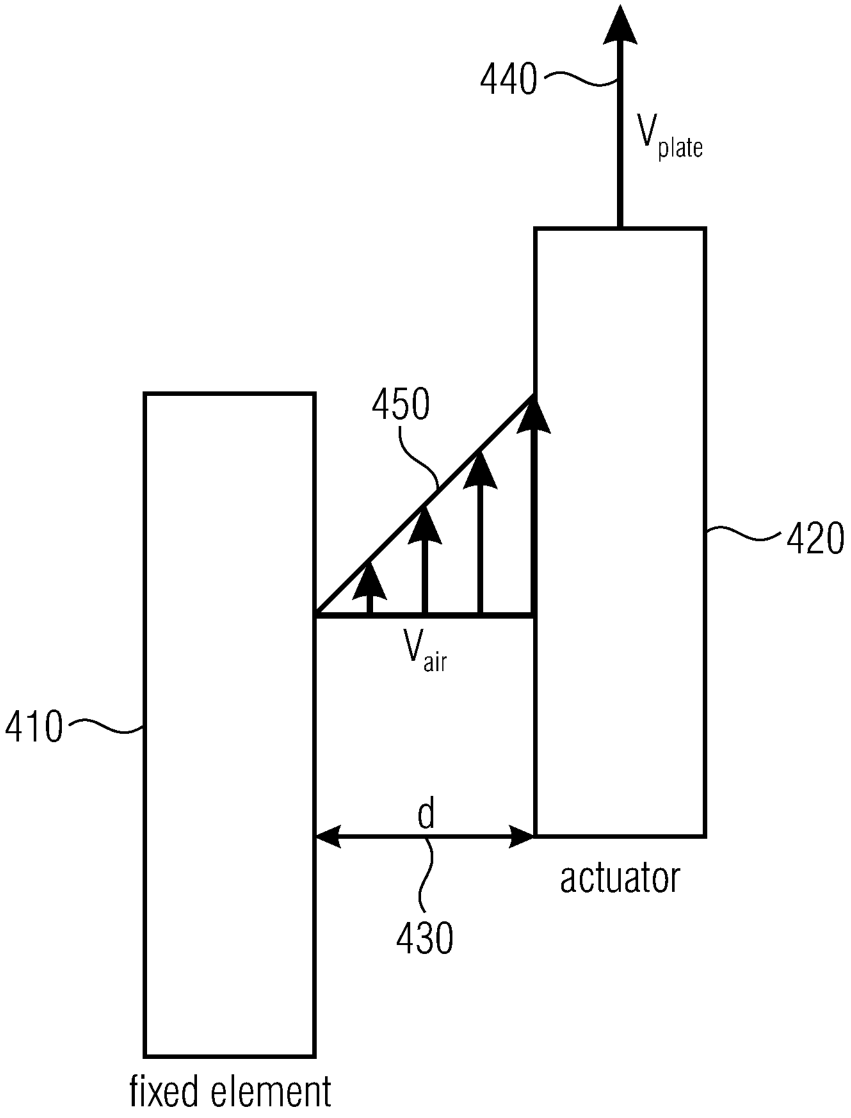
FIG. 4 shows an example of viscous air attenuation of a plate with parallel movement near a fixed plate element to discuss the physical principle in embodiments.

FIG. 4 shows an example of viscous air attenuation of a plate with parallel movement near the plate surface or, with regard to the distance of the plates relative to the plate surface, at a fixed plate element and thus illustrates the sectional illustration of actuator and surrounding structure. The surface of the actor and opposite structure elements, here implemented as a plate, are, in accordance with embodiments, maximized by meandering structures or, in general, recess and projection. FIG. 4 shows a schematic sectional view of a plate 410 of the surrounding structure, which comprises a fixed element, and a plate 420 of the actuator. Generally, the fixed element may be a, for example, immobile part of the surrounding structure, or the surrounding structure itself. The fixed element may, for example, be a substrate. The two plates are arranged to be distanced from each other by a distance d 430. The plate 420 of the actuator comprises a relative speed $v_{plate}$ 440 so that it moves past same in parallel to the plate 410 of the surrounding structure. A speed distribution 450 of the speed of the air $v_{air}$, of the gap between the two plates 410, 420 is plotted between the plates 410, 420.

If the distance d 430 of the plates is small when compared to the plate dimensions, the speed of air increases linearly from zero to the value v from the fixed plate 410 to the moved plate 420. The air layers between the plates may thus pass one another at different speeds. The result may be a friction force $F_r$, which can be calculated using Newton's law of friction:

$$F_r = \eta A v / d.$$

Thus, A is the overlap of the plate areas, d is the plate distance 430, v is the speed 440 of the moved plate ($v_{plate}$), and η is the viscosity of air. The friction force is proportional to the speed 440 of the moved plate and represents an attenuation element in the differential equation of plate movement or oscillation.

Correspondingly, an MEMS sound transducer can be provided by the implementation of actuator and surrounding structure in accordance with the disclosure, having recesses and/or projections or plate structures, for example projections, which enables a desired attenuation of certain frequencies by adjusting the overlapping area and the distance of the relatively moved areas of actor and surrounding structure.

Figure 6:
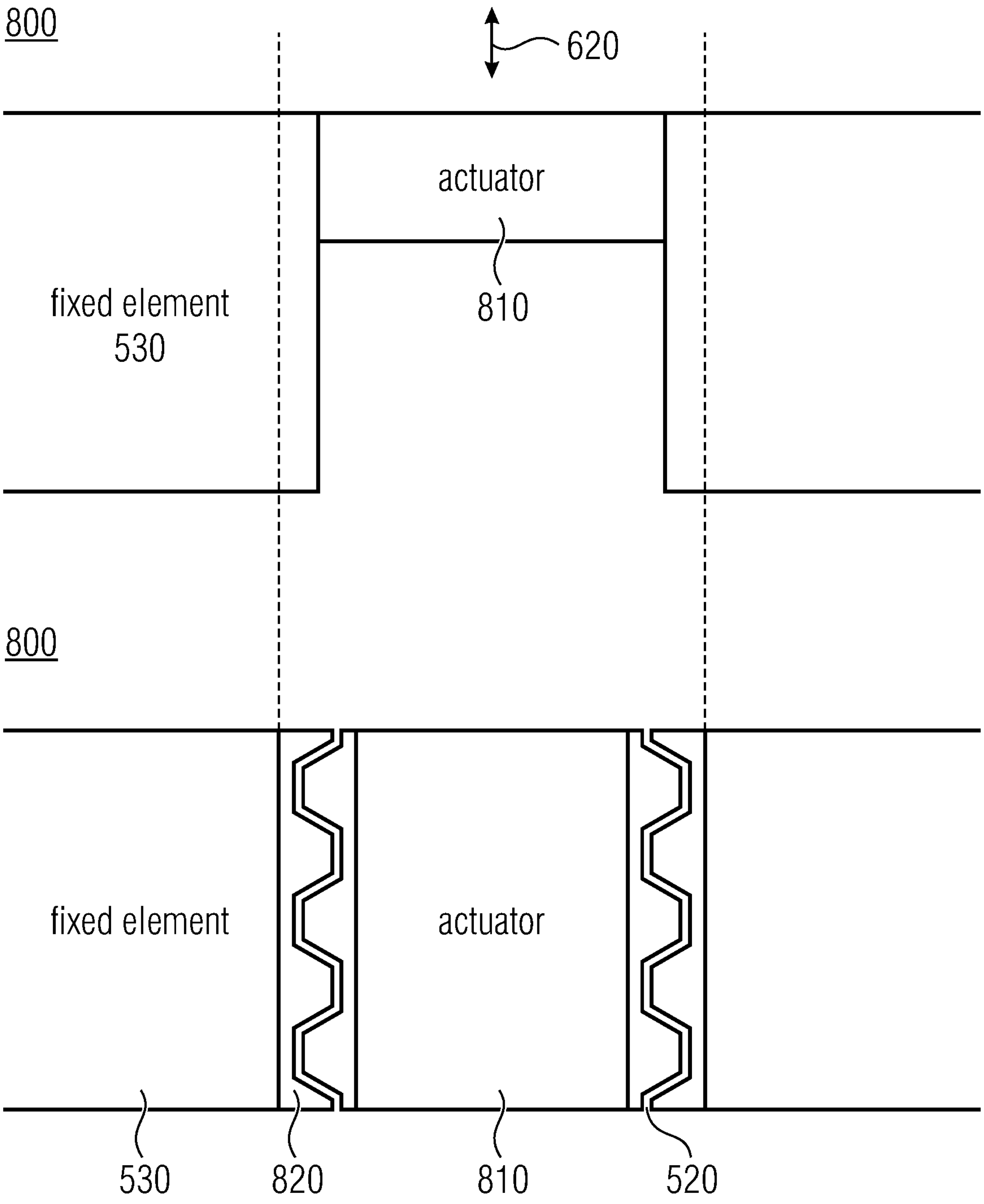
FIG. 6 shows a schematic illustration of an MEMS sound transducer in accordance with an embodiment of the present disclosure, having comb-shaped recesses and projections at the edge of the actuator and the surrounding structure which has a fixed element.

FIG. 6 shows schematic views of an MEMS sound transducer in accordance with an embodiment of the present disclosure, having projections and recesses. FIG. 6 at the top shows a schematic sectional view of an MEMS sound transducer 800 and FIG. 6 at the bottom shows a schematic top view of an MEMS sound transducer 800.

FIG. 6 at the top shows the MEMS sound transducer 800 having an actuator 810 which is separated from a surrounding structure 530 by one or more gaps 520, the surrounding structure 530 comprising a fixed element. The actuator 810 is configured to execute a relative movement 620 between the actuator 810 and the surrounding structure 530. The actuator 810 and the surrounding structure 530, which may be implemented as comb structures so that the gap 520 also follows the comb structure, are illustrated in the top view in the lower part of the figure.

FIG. 6 at the bottom shows recesses and projections 820 between a lifting actuator 810 and the surrounding structure 530 which has a fixed element, in a top view. The recesses and projections 820 thus may be implemented to be comb structures and thus exemplarily be arranged to be interdigitating (continuously along the mutually facing edge areas of the lifting actuator 810 and the surrounding structure 530). FIG. 6 shows a possible combination of recesses and projections in accordance with implementations of the disclosure. It is to be illustrated by means of FIG. 6 that, in accordance with the disclosure, a plurality of possible arrangements are possible, providing a desired attenuation, for example of certain frequencies, for MEMS sound transducers. In addition, it is to be pointed out that plate structures (not illustrated) or optional plates or shields may be arranged, for example, perpendicularly to the actuator 610 at the edge of the surrounding structure 530 (that is the edge facing the actuator 610) or actuator. The shields/plates basically extend in parallel to the direction of movement 630 (that is from the substrate) and prevent the gap from increasing in size along the movement. Additionally, the overlapping area between the actuator 610 and the surrounding structure 530 can be increased by the plate structures to amplify viscous gas friction and, correspondingly, attenuation of certain resonant frequencies. The plate structures here may be implemented to be projections, wherein the actuator can be implemented as a recess, or vice versa.

By means of the combination with the example of FIG. 6, strong attenuation can be achieved, for example, by increasing the overlapping areas. For the technological implementation of the attenuation discussed before, the arrangement may be on the actuator 810 of the MEMS sound transducer, for example loudspeaker, moving in a vertical direction and on an opposite surrounding structure 530, for example on an opposite fixed element or fixed element having projections and recesses 820. By these flow-mechanical structures, the actuator movement can be attenuated by the viscous gas flow, for example air flow. It becomes obvious from the friction force equation that attenuation will be at a maximum if the largest possible area is arranged at the closest possible distance. This means that attenuation structures having recesses and projections 820 having a high aspect ratio may be of advantage. The overlapping area of the elements 610 can also be increased by implementing the elements as interdigitating comb structures having a plurality of fingers, or by implementing the recesses and projections 820 as interdigitating comb structures having a plurality of fingers.

As is shown in FIG. 6, the actuator 810 may optionally be implemented as a lifting actuator. Further embodiments, however, also comprise corresponding bending actuators having respective plate structures with recesses and projections.

Figure 7:
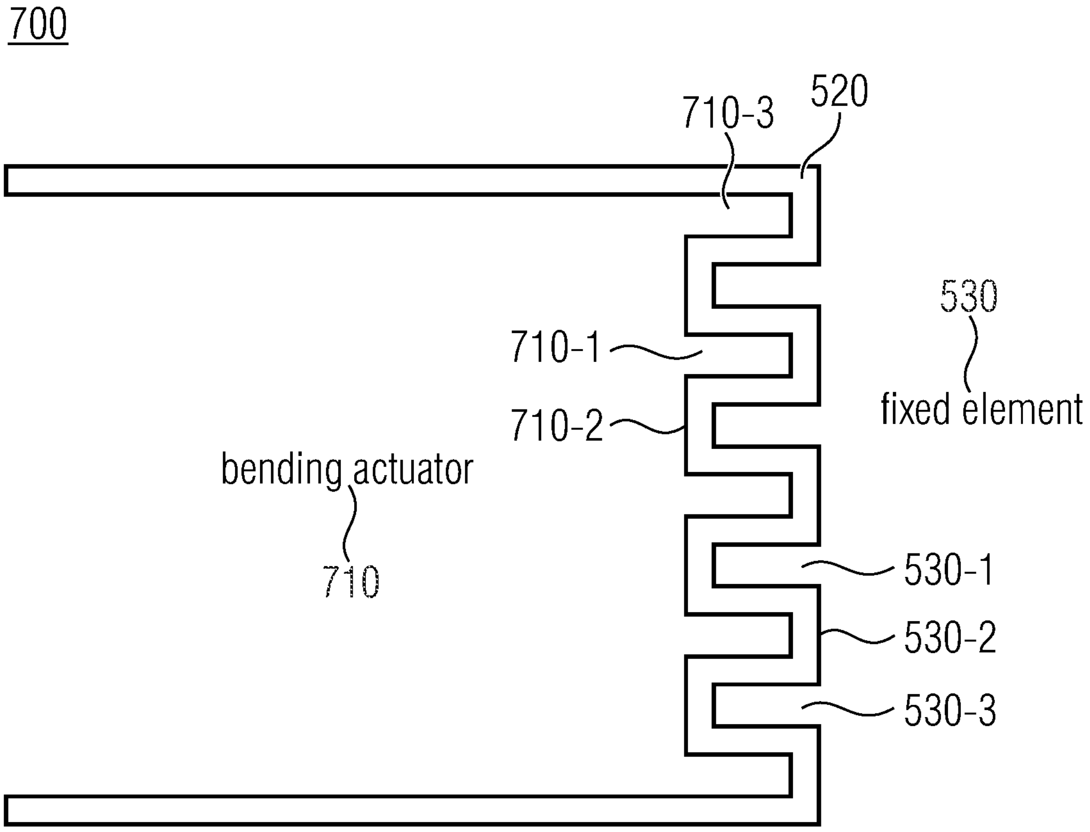
FIG. 7 shows a variation of the MEMS sound transducer from FIG. 6 in accordance with an embodiment of the present disclosure, having plate structures with projections and recesses.

FIG. 7 shows a schematic top view of an MEMS sound transducer in accordance with an embodiment of the present disclosure, having comb-shaped recesses and projections at the edge of the actuator and the surrounding structure having a fixed element. FIG. 7 shows an MEMS sound transducer 700 having a bending actuator 710 which is laterally opposite a surrounding structure 530, having a fixed element, in a plane. The bending actuator 710 is suspended relative to the surrounding structure 530 at least on one side and configured to execute, with one end of the bending actuator 710, a relative movement between the bending actuator 710 and the surrounding structure 530 at least partially perpendicularly to the plane, that is at least partially perpendicularly to the image plane of FIG. 7.

A plurality of recesses 710-1 and projections 710-2 in the form of a first comb structure 710-3 is implemented at the movable end of the bending actuator 710, in the common plane of the bending actuator 710 and the surrounding structure 530. The surrounding structure, on a side facing the movable end of the bending actuator, comprises a plurality of recesses 530-2 and projections 530-1 in the form of a second comb structure 530-3, wherein the first and second comb structures are configured to interdigitate. The two comb structures are separated from each other by a gap 520.

In other words, FIG. 7 shows comb structures at the edge of the actuator and the surrounding structure, having a fixed element. As has been mentioned before, the overlapping area, of the attenuation plate structures, for example, can be increased by being formed as combs. In the embodiment illustrated in FIG. 7, comb structures 710-3, for example having a high aspect ratio, are arranged at the movable end of the bending actuator 710. These move within one another with closely distanced comb structures 530-3 on the surrounding structure 530, for example a fixed, laterally opposite element. In the same way, attenuation comb structures can also be integrated in the case of lifting actuators moving like pistons (for example in analogy to FIG. 6). In this case, the comb structures can be arranged along the entire periphery of the actuator.

Figure 8:
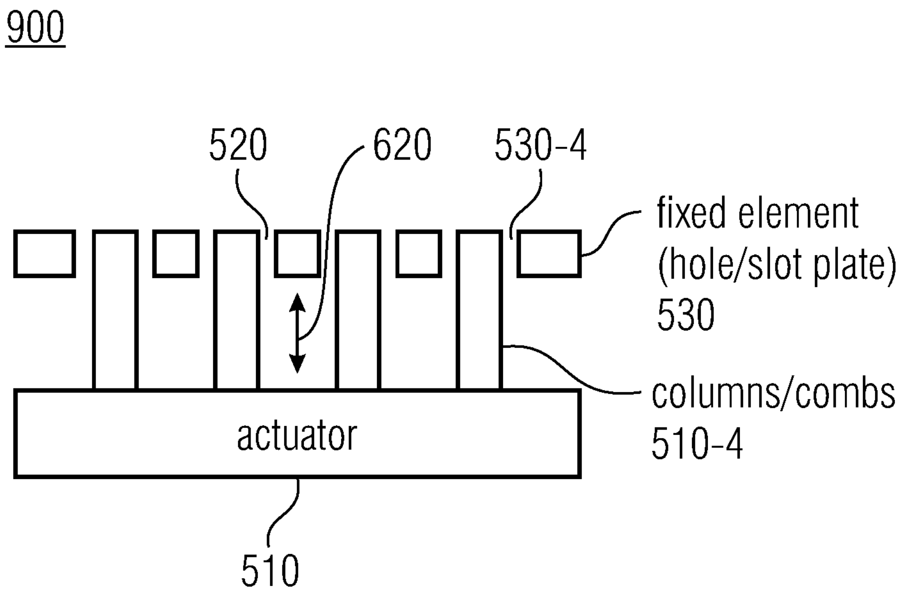
FIG. 8 shows a schematic side view of an MEMS sound transducer in accordance with an embodiment of the present disclosure, having columns or vertical comb structures on the actuator, and hole or slot plates as the fixed element.

FIG. 8 shows a schematic side view of an MEMS sound transducer in accordance with an embodiment of the present disclosure, having columns, or vertical comb structures, on the actuator and hole or slot plates as a fixed element, which forms the surrounding structure or a part of the surrounding structure. FIG. 8 shows an MEMS sound transducer 900 having an actuator 510 in a first plane, a surrounding structure 530 in a second plane, wherein the surrounding structure 530 comprises a fixed element which is implemented as a hole or slot plate, and wherein the first and second planes are parallel to each other. The actuator is configured to execute a relative movement 620 between the actuator 510 and the surrounding structure 530 perpendicularly to the first and second planes. The actuator comprises a plurality of projections in the form of columns and/or combs 510-4, wherein the columns and/or combs 510-4 are arranged perpendicularly to the parallel planes on a surface of the actuator facing the surrounding structure 530. The surrounding structure 530 comprises a plurality of recesses in the form of holes and/or slots 530-4 and the columns and/or combs 510-4 of the actuator and the holes and/or slots 530-4 of the surrounding structure are configured so as to be interdigitating and separated by a gap 520.

In other words, FIG. 8 shows columns, or vertical comb structures, on the actuator 510 and a hole or slot plate as the fixed element which forms the surrounding structure or part of the surrounding structure. In this embodiment, the attenuation structures are arranged on the entire area of the actuator 510. They may be implemented to be columns and/or combs 510-4. The fixed element 530 here is arranged vertically above the actuator 510 and implemented as a hole and/or slot plate. In the same way, the attenuation structures may also be arranged below the actuator 510 or on both sides of the actuator.

An MEMS sound transducer in accordance with FIG. 8 may be manufactured easily by using a hole or slot plate and thus at low cost since no specially defined etching depths for the recesses, for example, are to be considered. In addition, the arrangement of a plurality of columns and/or combs 510-4 and respective holes and/or slots 530-4 allows a strong increase in the overlapping area for strong attenuations.

Figure 9:
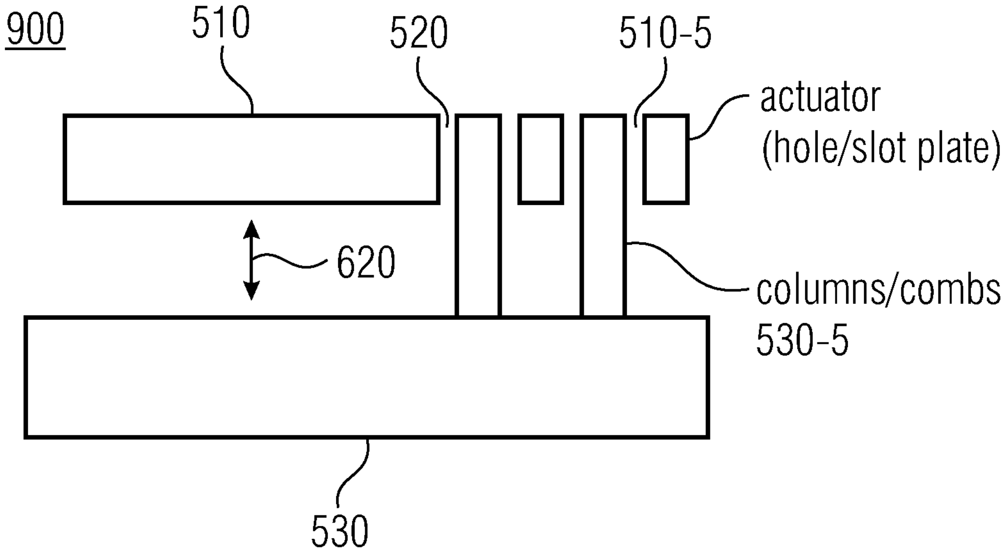
FIG. 9 shows a schematic side view of an MEMS sound transducer in accordance with an embodiment of the present disclosure, having an actuator with a hole plate and columns and/or combs on a fixed element.

FIG. 9 shows a schematic side view of an MEMS sound transducer in accordance with an embodiment of the present disclosure, having an actuator with a hole plate and columns and/or combs on the fixed element, which forms the surrounding structure or part of the surrounding structure. FIG. 9 shows an MEMS sound transducer 1000 having a surrounding structure 530 arranged in a first plane, and an actuator 510 arranged in a second plane, the first and second planes being parallel to each other. The actuator 510 is configured to execute a relative movement 620 between the actuator 510 and the surrounding structure 530 perpendicularly to the first and second planes. The surrounding structure 530 comprises a plurality of projections in the form of columns and/or combs 530-5, wherein the columns and/or combs 530-5 are arranged perpendicularly to the parallel planes on a surface of the surrounding structure facing the actuator 510. The actuator 510 comprises a plurality of recesses in the form of holes and/or slots 510-5, wherein the actuator 510, however, is implemented only partly as a hole or slot plate. The columns and/or combs 530-5 of the surrounding structure and the holes and/or slots 510-5 of the actuator thus are configured to interdigitate and be separated by a gap 520.

In other words, FIG. 9 shows an actuator having a hole plate and columns and/or combs 530-5 on a surrounding structure 530 which has a fixed element. In this embodiment, the surrounding structure 530 or the fixed element supports columns or combs 530-5 into which or from which the actuator 510 moves. Thus, the actuator 510 is implemented at least partly as a hole and/or slot plate.

An MEMS sound transducer in accordance with FIG. 9 allows the advantages, discussed already in connection with FIG. 8, relating to manufacturing. Implementing the actuator 510 only partly as a hole or slot plate can be of advantage with regard to the possible sound pressure level and may result in improved decoupling between the emitted air volume and the sound pressure behind the actuator, opposite to the direction of emission.

CONCLUSIONS AND FURTHER REMARKS

Embodiments in accordance with the present disclosure provide MEMS loudspeakers or MEMS ultrasonic transducers having viscous air dumping, characterized in that microstructures having a high aspect ratio are arranged on an actuator moving in a vertical direction and on a vertically or laterally opposite fixed element or surrounding structure, the microstructures moving at a small distance relative to one another, thereby attenuating the actuator movement by the air flow in a viscous manner.

Further embodiments in accordance with the present disclosure provide MEMS loudspeakers having a piezoelectric or magnetic or electrostatic drive.

Further embodiments in accordance with the present disclosure comprise an aspect ratio of microstructures between height/width of >10 and/or a height of the microstructures of >50 μm.

Further embodiments in accordance with the present disclosure comprise attenuation structures, like recesses and projections, at the edge of the actuator and the surrounding structure and/or the fixed element, for example in the form of plates or comb structures.

Further embodiments in accordance with the present disclosure comprise columns or comb structures on an actuator surface, hole or slot structures on the surrounding structure, like the fixed element.

Further embodiments in accordance with the present disclosure comprise hole or slot structures in the actuator surface, columns or comb structures on the surrounding structure, like the fixed element.

Further embodiments in accordance with the present disclosure comprise attenuation structures made of silicon, Si compounds, metals or polymers.

Further embodiments in accordance with the present disclosure provide MEMS loudspeakers with a frequency range of 20 Hz-20 kHz.

Further embodiments in accordance with the present disclosure provide MEMS ultrasonic transducers in a frequency range from 20 kHz to 100 MHz.

Embodiments in accordance with the present disclosure comprise MEMS sound transducers or loudspeakers for in-ear headsets and/or free-field loudspeakers for applications close to the ear.

Very generally, embodiments in accordance with the present disclosure provide for the loudspeaker attenuation to be integrated directly into the MEMS structure, like the MEMS sound transducer, and to be adjusted by the arrangement and dimensioning of the microstructures. This may result in a decisive advantage of MEMS sound transducers in accordance with the disclosure, for example with regard to the space consumed and functionality, for example for mobile applications.

All the materials, environmental influences, electrical characteristics and optical characteristics mentioned here are to be interpreted to be only exemplary and not exclusive.

Although some aspects have been described in the context of an apparatus, it is understood that these aspects also represent a description of the corresponding method so that a block or component of an apparatus is also to be understood to be a corresponding method step or a feature of a method step. In analogy, aspects described in connection with or as a method step also constitute a description of a corresponding block or detail or feature of a corresponding apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A method for manufacturing an MEMS sound transducer for generating sound, comprising:

providing an actuator and a surrounding structure, wherein the actuator is separated from the surrounding structure by one or more gaps and is configured to execute a relative movement between the actuator and the surrounding structure, and wherein the actuator and the surrounding structure comprise a plurality of recesses and projections, wherein the plurality of projections belonging to the actuator are arranged to interdigitate into the plurality of recesses belonging to the surrounding structure, and/or the plurality of projections belonging to the surrounding structure to interdigitate into the plurality of recesses belonging to the actuator, forming the interdigitating elements such that the interdigitating elements are thus separated by the one or more gaps, and such that overlapping areas of the plurality of recesses and projections are configured such that the interdigitating elements comprise a frequency-depending attenuation function with a relative movement between the actuator and the surrounding structure to suppress harmonic distortions; and wherein the overlapping areas are directly opposite areas moving past each other by the relative movement.

2. The method for manufacturing an MEMS sound transducer in accordance with claim 1, wherein an aspect ratio of height/width of the plurality of recesses and projections, the overlapping areas of actuator and surrounding structure which move past each other by the relative movement, and the distance of the overlapping areas of actuator and surrounding structure are configured to adjust a frequency-dependent attenuation to suppress harmonic distortions, wherein the height is a height orthogonally to a surface of the actuator or the surrounding structure on which the projection is arranged, and wherein the width is a width in parallel to the surface of the actuator or the surrounding structure on which the projection is arranged.

3. The method for manufacturing an MEMS sound transducer in accordance with claim 1, wherein the surrounding structure is formed by a substrate.

4. The method for manufacturing an MEMS sound transducer in accordance with claim 1, wherein the plurality of recesses and projections are implemented as microstructures comprising an aspect ratio between height/width of more than 5, wherein the height is a height orthogonally to a surface of the actuator or the surrounding structure on which the projection is arranged; and wherein the width is a width in parallel to the surface of the actuator or the surrounding structure on which the projection is arranged.

5. The method for manufacturing an MEMS sound transducer in accordance with claim 1, wherein the actuator comprises a piezoelectric or magnetic or electrostatic drive; and/or wherein the actuator is formed by a bending transducer.

6. The method for manufacturing an MEMS sound transducer in accordance with claim 1, wherein the projections of the plurality of projections comprise a height of more than 50 μm, and wherein the height is a height orthogonally to a surface of the actuator or the surrounding structure on which the respective projection is arranged.

7. The method for manufacturing an MEMS sound transducer in accordance with claim 1, wherein the plurality of projections are implemented as columns and/or combs, and wherein the plurality of recesses are implemented as holes and/or slots.

8. The method for manufacturing an MEMS sound transducer in accordance with claim 1, wherein the plurality of recesses and projections are made of at least one of silicon, silicon compounds, metals or polymers.

9. The method for manufacturing an MEMS sound transducer in accordance with claim 1, wherein the MEMS sound transducer is configured to generate signals in a frequency range of at least 20 Hz and/or up to 20 kHz; and/or wherein the MEMS sound transducer is an MEMS ultrasonic transducer, the MEMS ultrasonic transducer being configured to generate signals in a frequency range of at least 20 kHz and/or up to 100 MHz.

10. The method for manufacturing an MEMS sound transducer in accordance with claim 1, wherein the one or more gaps comprise a width of less than 20 μm, less than 10 μm or less than 5 μm, or, generally, comprise a width in a range between 0.1 and 20 μm.

11. The method for manufacturing an MEMS sound transducer in accordance with claim 1, wherein the actuator is implemented as a bending actuator, and wherein the bending actuator and the surrounding structure are laterally opposite each other in a plane; and wherein the bending actuator is suspended relative to the surrounding structure at least on one side; and wherein the bending actuator is configured to execute, with an end of the bending actuator, the relative movement between the bending actuator and the surrounding structure at least partially perpendicularly to the plane; and wherein, at the moveable end of the bending actuator, a plurality of recesses and/or projections in the form of a first comb structure are implemented, in the common plane of the bending actuator and the surrounding structure; and wherein the surrounding structure comprises a plurality of recesses and/or projections in the form of a second comb structure on a side facing the movable end of the bending actuator, wherein the first and second comb structures are configured to interdigitate.

12. The method for manufacturing an MEMS sound transducer in accordance with claim 1, wherein the actuator is implemented as a lifting actuator, and wherein the lifting actuator and the surrounding structure are arranged in a plane; and wherein the lifting actuator is configured to execute the relative movement between the lifting actuator and the surrounding structure perpendicularly to the plane; and wherein the lifting actuator comprises a plurality of recesses and/or projections in the form of a first comb structure along its periphery in the plane; and wherein the surrounding structure comprises a plurality of recesses and/or projections in the form of a second comb structure on a side facing the first comb structure; and wherein the first and the second comb structures are configured to interdigitate.

13. The method for manufacturing an MEMS sound transducer in accordance with claim 1, wherein the actuator is arranged in a first plane, and wherein the surrounding structure is arranged in a second plane, the first and second planes being parallel to each other; and wherein the actuator is configured to execute the relative movement between the actuator and the surrounding structure perpendicularly to the first and second planes; and wherein the actuator comprises a plurality of projections in the form of columns and/or combs, wherein the columns and/or combs are arranged on a surface of the actuator facing the surrounding structure, perpendicularly to the parallel planes; and wherein the surrounding structure comprises a plurality of recesses in the form of holes and/or slots; and wherein the columns and/or combs of the actuator and the holes and/or slots of the surrounding structure are configured to interdigitate.

14. The method for manufacturing an MEMS sound transducer in accordance with claim 1, wherein the surrounding structure is arranged in a first plane, and wherein the actuator is arranged in a second plane, the first and second planes being parallel to each other; and wherein the actuator is configured to execute the relative movement between the actuator and the surrounding structure perpendicularly to the first and second planes; and wherein the surrounding structure comprises a plurality of projections in the form of columns and/or combs, wherein the columns and/or combs are arranged on a surface of the surrounding structure facing the actuator, perpendicularly to the parallel planes; and wherein the actuator comprises a plurality of recesses in the form of holes and/or slots; and wherein the columns and/or combs of the surrounding structure and the holes and/or slots of the actuator are configured to interdigitate.

15. An MEMS sound transducer for generating sound, comprising:

an actuator, wherein the actuator is separated from a surrounding structure by one or more gaps and is configured to execute a relative movement between the actuator and the surrounding structure, and the surrounding structure, wherein the actuator and the surrounding structure comprise a plurality of recesses and projections, wherein the plurality of projections belonging to the actuator are arranged to interdigitate into the plurality of recesses belonging to the surrounding structure, and/or the plurality of projections belonging to the surrounding structure to interdigitate into the plurality of recesses belonging to the actuator, wherein the interdigitating elements are separated by one or more gaps, and wherein the interdigitating elements are separated by one or more gaps such that the interdigitating elements comprise an attenuation function with a relative movement between the actuator and the surrounding structure; and wherein the actuator is arranged in a first plane, and wherein the surrounding structure is arranged in a second plane, the first and second planes being parallel to each other, and wherein the actuator comprises a plurality of projections in the form of columns and/or combs, wherein the columns and/or combs are arranged on a surface of the actuator facing the surrounding structure, perpendicularly to the parallel planes, and wherein the surrounding structure comprises a plurality of recesses in the form of holes and/or slots, and wherein the columns and/or combs of the actuator and the holes and/or slots of the surrounding structure are configured to interdigitate, and wherein the actuator is configured to execute the relative movement between the actuator and the surrounding structure perpendicularly to the first and second planes and perpendicularly to the surface of the actuator on which the columns and/or combs are arranged; and/or wherein the surrounding structure is arranged in a first plane, and wherein the actuator is arranged in a second plane, the first and second planes being parallel to each other, and wherein the surrounding structure comprises a plurality of projections in the form of columns and/or combs, wherein the columns and/or combs are arranged on a surface of the surrounding structure facing the actuator, perpendicularly to the parallel planes, and wherein the actuator comprises a plurality of recesses in the form of holes and/or slots, and wherein the columns and/or combs of the surrounding structure and the holes and/or slots of the actuator are configured to interdigitate, wherein the actuator is configured to execute the relative movement between the actuator and the surrounding structure perpendicularly to the first and second planes and perpendicularly to the surface of the surrounding structure on which the columns and/or combs are arranged.

* * * * *